VISUAL IMAGE PROJECTION DEVICE AND PROCESS

Filed Feb. 8, 1968 4 Sheets-Sheet 1

INVENTORS.
ALFRED F. KASPAUL,
ERIKA E. KASPAUL,
BY
Allen A. Dicke, Jr.,
AGENT.

Oct. 6, 1970 A. F. KASPAUL ETAL 3,532,814

VISUAL IMAGE PROJECTION DEVICE AND PROCESS

Filed Feb. 8, 1968 4 Sheets-Sheet 3

United States Patent Office 3,532,814
Patented Oct. 6, 1970

3,532,814

VISUAL IMAGE PROJECTION DEVICE AND PROCESS

Alfred F. Kaspaul and Erika E. Kaspaul, Malibu, Calif., assignors to Hughes Aircraft Company, Culver City, Calif., a corporation of California
Filed Feb. 8, 1968, Ser. No. 704,082
Int. Cl. H04n 5/74
U.S. Cl. 178—7.5 22 Claims

ABSTRACT OF THE DISCLOSURE

A transparent substrate as an adsorbed or chemically reacted halogen layer thereon. A latent image is produced by modulated electron beam exposure directed onto the halogen layer, to cause halogen separation from the substrate. Development of this latent image is accomplished by deposition thereon of metal from metal vapor. This image can be projected. Following projection, the image metal is evaporated and the halogen returns to the substrate so that the substrate can be reused.

BACKGROUND OF THE INVENTION

The projector of this invention falls into that class of equipment and processes wherein a modulated electrical signal such as a television signal produces an image which can be projected on a large screen, and the image is later erased so that the medium is continually reusable.

There are two classes of equipment in the prior art which attempt to provide a projected image of information that was originally a modulated electrical signal, such as a television signal. The first of these classes includes the cathode ray tube type of device wherein the image on the face of the cathode ray tube is projected onto a screen by means of the image intensity on the tube face. Of course, this has obvious limits on projection because of the illumination intensity limits obtainable even in specially designed cathode ray tubes for that purpose. In the present state of the art, such constructions are completely unsatisfactory for projecting large screen images, when one is thinking in terms of screen size appropriate for theatre use.

The second class of devices intended for this purpose falls in the proprietary subject matter of the Eidophor system. In this system a modulated signal is caused to regulate the thickness of oil upon a transparent image plate, and schlieren optics convert the oil thickness differences representing the image upon a screen. However, the complicated schlieren optics have substantial light losses to drastically reduce the amount of light from the projector lamp which is usable for image forming on the screen. Both the system of forming an image represented by the thickness variations in an oil layer by means of electron beam projection and the schlieren optics are unusually sensitive to variations and difficulties, and thus have a tendency to be unreliable in ordinary commercial usage.

SUMMARY OF THE INVENTION

In summary, this invention is directed to an apparatus and a process for projection of the information contained in a modulated electrical signal upon a screen. For example, visual information furnished in electrical form such as a television signal can be reconstituted as an image having transparency varying from place to place on the image, so that the image can be projected by ordinary projection optics. This is accomplished in a first case by providing active sites upon a transparent media. The transparent media is in a halide atmosphere so that halide is adsorbed by the active sites. The modulated television signal is projected as a modulated deflecting electron beam upon the adsorbed iodine layer, thus displacing the adsorbed iodine to a greater extent where the signal is stronger. This latent image is preferably developed concurrently with the electron exposure by the deposition of zinc thereon from a zinc vapor source and continued thereafter for completion of the image. The zinc deposits more thickly where there is less iodine adsorbed upon the nucleation centers.

In a second case, a transparent substrate is coated with a thin metal film such as copper and then this film is converted into a transparent metal halide such as cuprous iodide. The modulated electron beam dissociates the metal halide, in imagewise fashion, into metal and the corresponding halide and zinc metal is subsequently deposited in accordance with the video signal upon the nucleation centers which are formed by the free metal. Furthermore, the reaction of the depositing zinc metal onto irradiated but unnucleated portions of the halides results in further deposition of zinc and consequently is a much more dense deposit of the final image.

After zinc development, the image is projected by ordinary projection optics. Subsequent to projection, the image is erased by heating it so that the zinc forms zinc iodide, and the recording surface is again a transparency with nucleation centers adsorbing iodine vapor or a transparent media, temporarily coated with a thin copper film, which in turn is converted into cuprous iodide for subsequent recording. The zinc iodide is constantly dissociated by heating so that it results in iodine for the atmosphere and zinc for further deposition onto new images or out of the way. The recording medium is preferably stepped from station to station in the process so that as the electron beam is producing a latent image at one station, zinc is completing the development at another station and at still another station the projection takes place. Erasure of the image is completed at a further station. By advancement of the medium at a proper rate, the modulated electric signal is very quickly projected and the result appears like a conventional moving picture.

Accordingly, it is an object of this invention to provide an apparatus wherein a video signal can be quickly and easily projected on a large screen with adequate light intensity. It is a further object of this invention to provide a structure wherein the image formed upon the medium is erased after projection so that the medium can be continually reused for exposure, development and further projection. It is still another object to provide a process wherein electrical information can be recorded upon a medium as a latent image and the image can be developed before projection to provide high opacity in areas desired to be dark, followed by projection and erasure of the medium so that the medium can be reused. Other objects and advantages of this invention will become apparent from a study of the following portion of the specification, the claims and the attached drawings.

DESCRIPTION OF THE PREFERRED EMBODIMENTS

Figure 1:
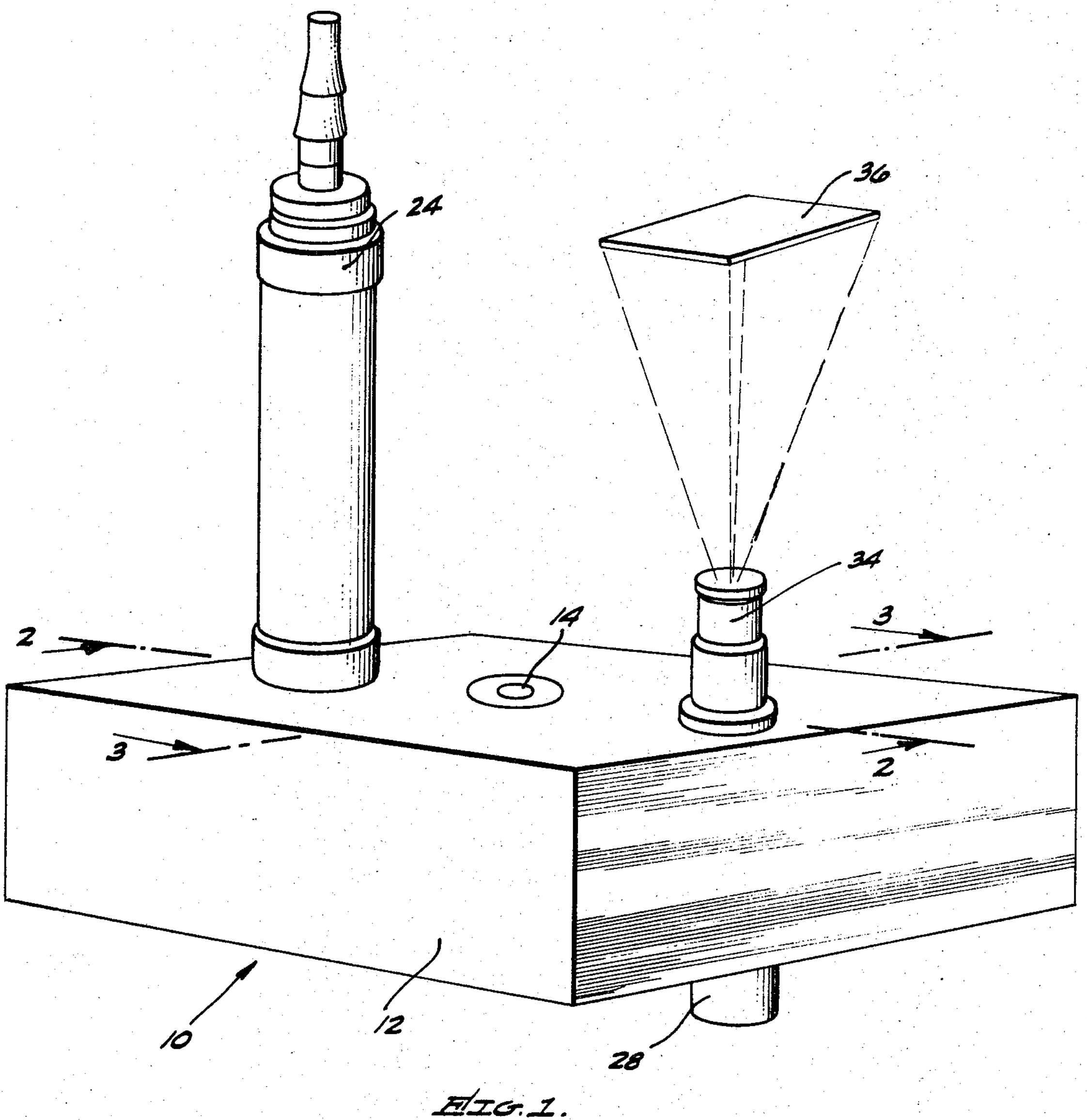
FIG. 1 is an isometric view of a projector embodying my invention.

FIG. 1 shows the projector 10 in perspective. Projector 10 comprises a housing 12 through the center of which extends rotatable shaft 14, which is mounted upon suitable bearings in housing 12. Motor 16 is connected to shaft 14 to drive the shaft. Shaft 14 is stepped in 90 degree steps, in the embodiment disclosed, so that motor 16 is a step motor. Between stepping energization, motor 16 holds shaft 14 in a stationary position.

Disc 18 is mounted upon shaft 14 to rotate therewith. Thus, disc 18 is stepped from station to station within housing 12. Disc 18 is made of transparent material, preferably glass, and has a layer 20 of tin dioxide, or the like on its upper surface to provide electrical conductivity. Furthermore, on top of the layer of tin dioxide is a very thin and invisible layer 22 of a metallic alloy. The preferred alloy is 80% nickel and 20% chromium. The alloy layer is sufficiently thin that disc 18 with its layers 20 and 22 is at least 80% transparent.

At Station I, electron gun 24 is positioned. Electron gun 24 is of conventional nature and is directly connected to housing 12 so that the electrons from the gun are directed onto the recording surface with layers 20 and 22 on disc 18. Both housing 12 and the interior chamber of gun 24 are evacuated to a pressure level consistent with proper electron gun operation. The preferred pressure within chamber 12 is $<10^{-2}$ torr and gun 24 is $<10^{-5}$ torr. Electron gun 24 is of such nature that it can receive a modulated signal and deflect the modulated signal so that the electron beam impingement upon the target area of layer 22 under electron gun 24 is patterned in the nature of the desired image. Thus, electron gun 24 operates like the electron gun in a cathode ray tube, including the deflection characteristics of such guns.

Figure 3:
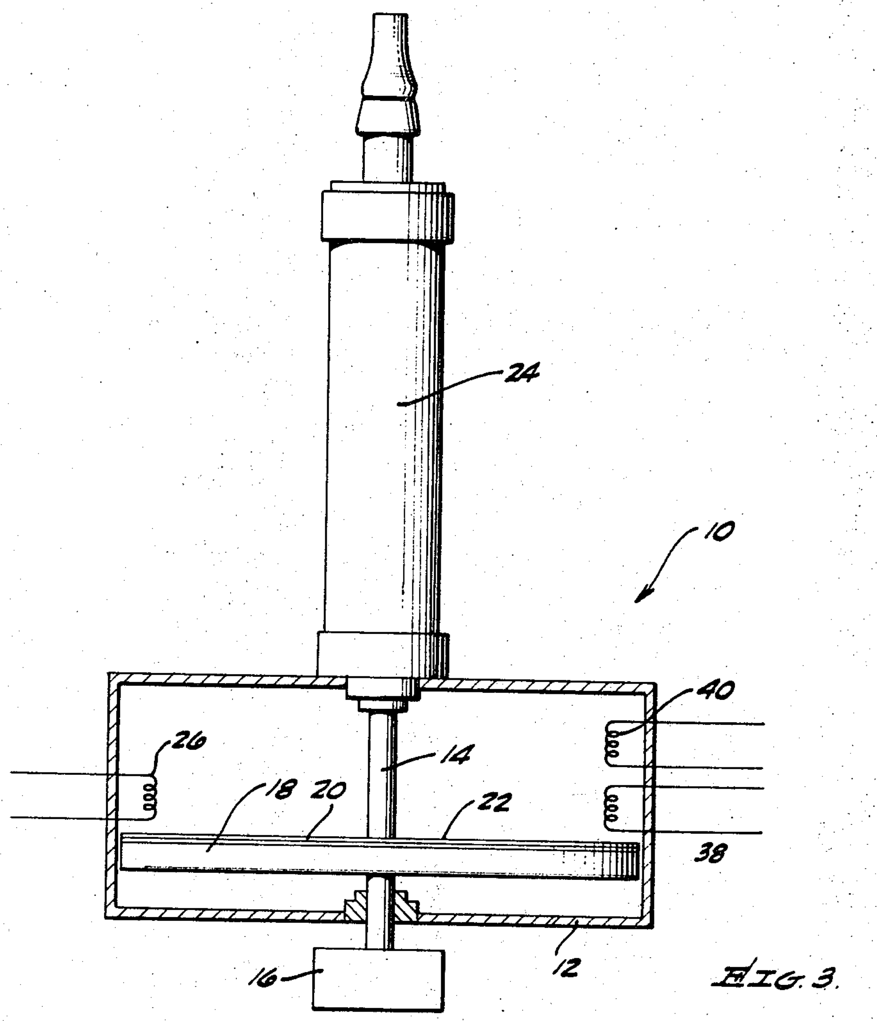
FIG. 3 is a section taken generally along the line 3—3 of FIG. 1.

Station II is shown at the left of FIG. 3 whereat zinc vapor source 26 is positioned adjacent the top surface of alloy layer 22. In the illustrated embodiment, zinc vapor source 26 is a heated zinc-coated wire which provides zinc vapor for selective deposition upon alloy layer 22. Other zinc vapor sources can be used, including a structure where a continuous zinc-coated wire is advanced past the surface of layer 22 and heated to produce the necessary zinc vapor. Alternatively, a boiling zinc pot could be used. Zinc vapor source 26 provides a zinc vapor concentration adjacent the surface of $10^{17}$ to $10^{20}$ atoms per square centimeter and second the zinc may also be produced by dissociation source 40 thus supplementing or replacing source 26.

Figure 2:
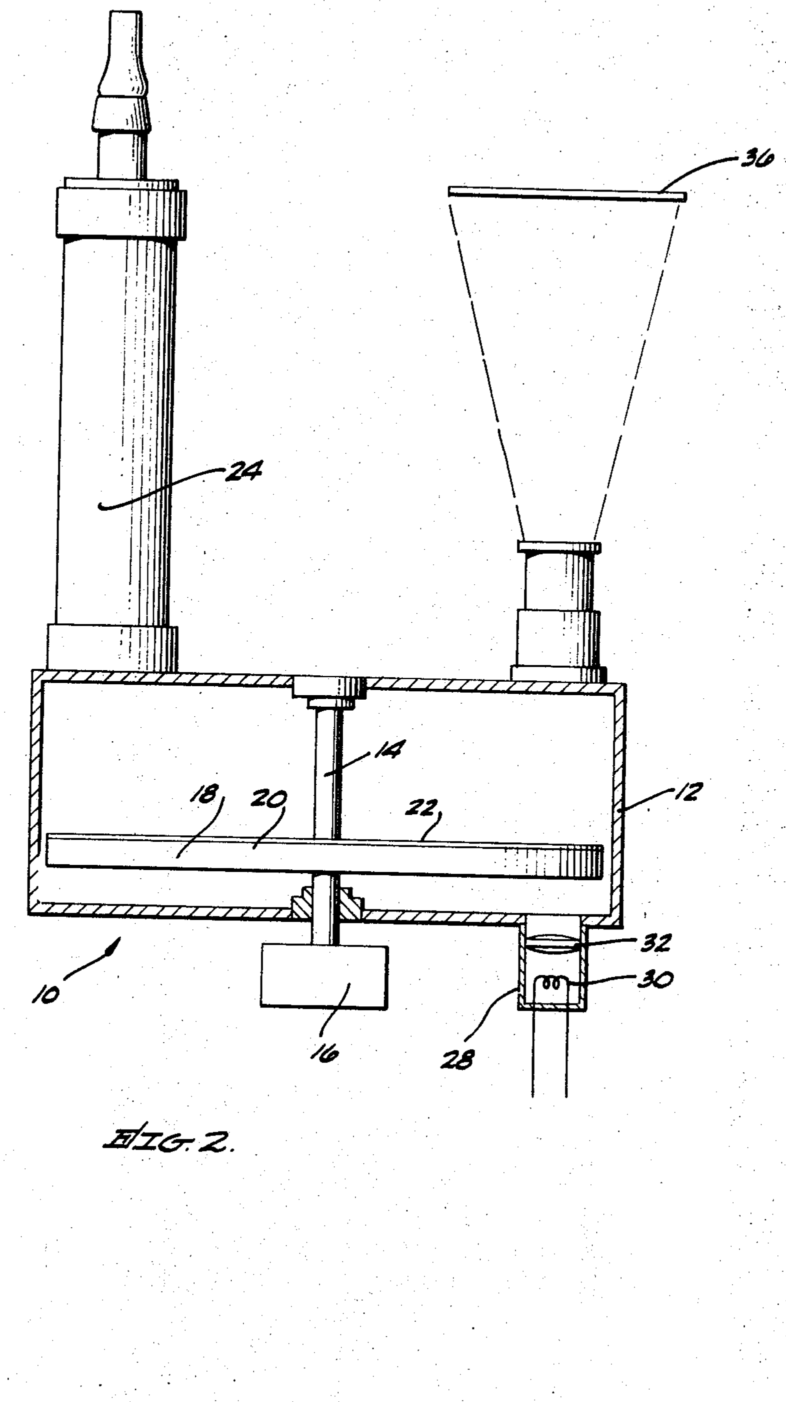
FIG. 2 is a section taken generally along lines 2—2 of FIG. 1.

Station III is shown at the right of FIG. 2 and is the optical projection station. Lamp housing 28 is mounted upon housing 12 and has lamp 30 therein. Lamp 30 provides the necessary illumination for projecting the image positioned at Station III, and the light passes through condensing lens 32. From lens 32 the light passes through disc 18, tin dioxide layer 20 and through the variable opacity of the image formed on the surface of alloy layer 22. From there the light passes through projecting lenses in lens tube 34 to project an image on screen 36.

Station IV is shown at the right hand side of FIG. 3, and includes eraser heater 38 and dissociation heater 40.

As far as the process is concerned, housing 12 is held at a preferred pressure of $<10^{-2}$ torr and its atmosphere is iodine vapor. The iodine vapor pressure is in the range of $10^{-1}$ to $10^{-4}$ torr and constitutes substantially the entire pressure. The iodine is produced at dissociation heater 40, as is hereinafter described, and may also be produced by an additional conventional iodine vapor source. A portion of the iodine vapor within housing 12 adsorbs upon alloy layer 22. As the particular image portion of disc 18 which has an adsorbed layer of iodine vapor is stepped under electron gun 24, to Station I, the adsorbed iodine is affected by the electron beam emitted by the electron gun. A modulated latent image is formed by displacement of the adsorbed iodine in accordance with the deflection and modulation of the electron beam. This forms a latent image in accordance with the image information contained in the modulated and deflected electron beam, which latent image can be developed.

Disc 18 is then stepped to Station II at zinc vapor source 26. At Station II, the zinc vapor source emits zinc vapor toward the upper surface of disc 18 so that zinc vapor is present at the surface of alloy layer 22. The zinc deposits upon the top of alloy layer 22 in accordance with the latent image characteristics. The exact mechanism of formation of the latent image and the deposition of the zinc thereon is not completely known. However, it is believed that electron impingement upon the alloy layer upon which iodine is adsorbed causes displacement of the iodine as well as exposure of prenucleation sites which normally, without the presence of a protective layer of adsorbed iodine, extend over the entire area of the upper surface of the alloy layer 22. Thus, freeing the iodine by desorption from the surface in a selective manner to create the latent image permits selective deposition of the zinc upon the recording surface.

Zinc vapor is present at the recording surface in a concentration of the order of $10^{18}$ atoms per square centimeter and second so that with a proper exposure, deposition of zinc occurs within a second or less to form a modulated optical image in accordance with the video signal. Since the deposited material is metallic zinc, the reflective image can also be used to an advantage in a reflux projection system writing "white on black." However, the transmitted image can be very contrasty, for a thin layer of zinc can be opaque. However, in those areas where full opacity is not required, transparent layers of varying degrees are deposited in accordance with the latent image and thus in accordance with the original electronic signal representing the image. Thus a continuous tone transparency is produced.

From the zinc developing Station II, the disc is advanced so that that image is moved into line with the projection system at Station III. As has been described, light transmittance through the image area can be anywhere from zero to the full transmittance of the disc with its tin dioxide layer and alloy layer. The disc with its basic layers, that is without any zinc deposited thereon, preferably has its light transmittance in excess of 80%. Thus, it can be seen that a projected image is projected on screen 36, and the image can be contrasty and of good continuous tone character. The amount of light is dependent upon the intensity of lamp 30, and is independent of the image forming portions of the system.

After projection, the image area is stepped to Station IV, directly adjacent eraser heater 38. Eraser heater 38 heats the image area to a proper temperature between 150° C. and 300° C., to cause reaction between the zinc deposited in the image area with the iodine in the atmosphere. The result is zinc iodide, which is in vapor form at the pressure in housing 12 and at the temperature associated with eraser heater 38.

The zinc iodide is dissociated by heater 40. Dissociation heater 40 decomposes the zinc iodide vapor above 600° C. into metallic zinc and iodine vapor. This iodine vapor contributes to the iodine vapor atmosphere in chamber 12. The eraser heater 38 and the dissociation heater 40 may be combined into one single source for convenience.

With all zinc removed from the image area now at Station IV, iodine can readsorb on the surface so that the image area is again ready for reexposure at Station I to form a new latent image. Stepping between stations is at such a rate that the appearance of "motion" on the screen is apparent. Of course, the projection system has a suitable shutter to interrupt the light beam when the disc is in motion, and the picture is projected onto the screen only when the disc is stationary. The disc may be replaced by an endless tape which can stand the erasure temperature. In motion picture work, 24 frames per second is adequate to provide the appearance of a continuously moving picture. In accordance with standard television practice in the United States, a frame is produced thirty times a second, so that with a television input signal the disc 18 would be stepped thirty times per second.

Under these circumstances, it can be seen that Stations II and IV can occupy more than one station position if desired. Only Stations I and III, the exposure and projection, need be positioned at a single station. In other words, the device could be provided with two Station II's, for example Stations II*a* and II*b*, and both of them would be developing stations. Similarly, if desired or if required, there could be Stations IV*a* and IV*b*, each providing for erasure of the already projected image, and there could be additional stations, if desired, to permit proper adsorption or reaction of iodine upon the surface before a particular portion of the surface is stepped back in line with the electron gun at Station I for reexposure.

Figure 4:
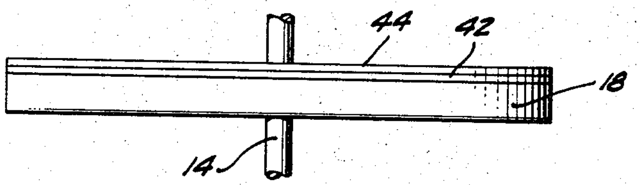
FIG. 4 is a partial section through the moving substrate showing the layers thereon in another embodiment.

The above description of operation discusses a process in which iodine is adsorbed on an alloy layer, and the electron gun displaces the adsorbed iodine in selected areas to form a latent image, which selected areas then become of such character that an image can be developed thereon. The image is deposited from zinc vapor. However, referring to FIG. 4, in another embodiment the disc 18 is first coated with a layer of nickel-chromium alloy 42, and then with a layer of copper 44. The nickel-chromium alloy 42 is again of preferably 80% nickel and 20% chromium, and the layer of copper is about 1000 angstroms thick. The copper layer is subsequently converted to cuprous iodide, and the whole structure then becomes at least 80% transparent to light in the visible wavelength. It is also a good conductor for electrons.

As the disc is rotated so that the image area of cuprous iodide is moved to Station I, underneath electron gun 24, it is ready for exposure. At Station I, the scanning electron beam scans electrons onto the cuprous iodide surface. Electron impingement causes dissociation of the cuprous iodide to create metallic copper nucleation sites which form a latent image subject to development.

As this latent image is moved to Station II, the zinc vapor source 26 selectively deposits zinc upon the latent image formed by metallic copper in the cuprous iodide layer 44. This is followed by a reaction of the zinc with unreacted cuprous iodide resulting in a denser image. The amount of zinc deposited is such that it varies in continuous tone from completely opaque to the transparency of the unexposed disc 18, wherein the disc is at least 80% transparent.

The image is then moved to Station III, which is the optical projection station. The light from the illumination source passes through disc 18, then through prenucleation layer 42 and through layer 44 in accordance with its opacity. By this means, an image is projected onto screen 36.

From the projection station, the image on the disc is rotated to the dissociation Station IV, shown at the right hand side of FIG. 3. In this case, only erasure heater 38 is needed, which heater raises the temperature of the image on the disc to about 200° C. This causes reaction of the metallic zinc with the iodine atmosphere to form zinc iodide which evaporates into the atmosphere. The metallic copper oxidizes to return to the state of the cuprous iodide 44 so that the image layer is again ready to accept a latent image from the electron beam. The image area is again ready for exposure and development.

Figure 5:
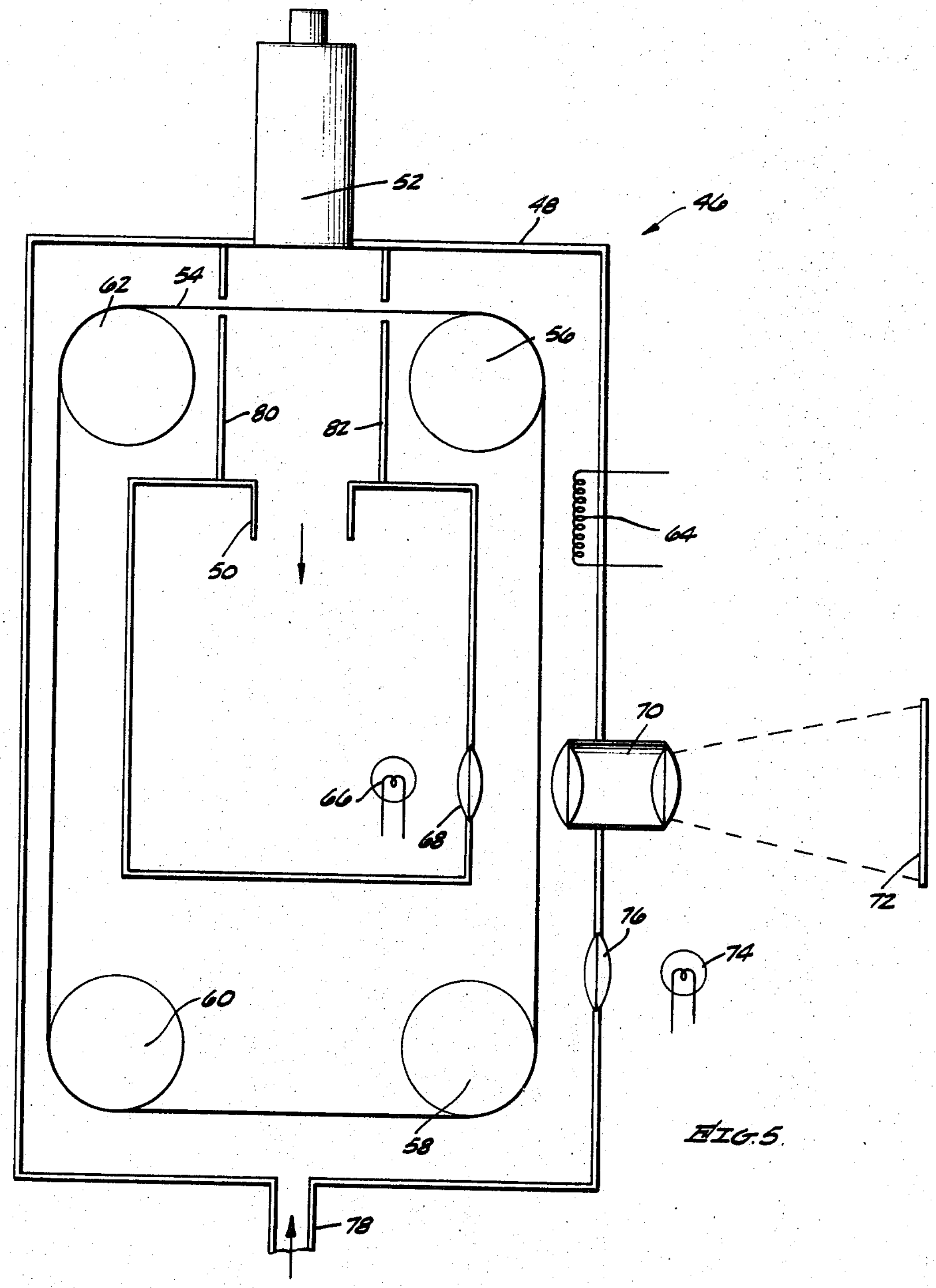
FIG. 5 is a schematic front elevational view with front cover removed of another projector embodying my invention.

Referring to FIG. 5, another projector is shown therein. As has been stated above, either of the above described processes can be used on a flexible tape, provided the flexible tape can stand the temperatures involved in development and erasure. The FIG. 5 illustrates an apparatus wherein a continuous flexible tape is used, and the description below describes it in connection with the cuprous iodide process. However, it is clear that it is also useful in the adsorbed iodine process.

Referring to FIG. 5, the projector is generally indicated at 46. Projector 46 includes a housing 48 which is tight so that a vacuum can be drawn on the interior thereof. Vacuum pump connection 50 is provided for the purpose of drawing the vacuums described with respect to the processes. Housing 48 is provided with an electron gun 52 which is focused to direct an electron beam upon film 54. Film 54 passes around guide rolls 56, 58, 60 and 62 which are fixed in the interior of housing 48 to guide the film 54 from station to station within the housing. At least one of the guide rolls is powered to stepwise advance the film both with respect to electron gun 52 and with respect to the projection station. If desired, such stepwise advance may incorporate free loops together with a toothed frame drive mechanism, such as is conventional in moving picture cameras and projectors. A suitable film for the usage indicated is manufactured by E. I. du pont de Nemours and Co., Inc. of Wilmington, Delaware. It is generically an aromatic polyimide sold under du pont's identification "Polymer–SP–1." In film form, the product is identified by the mark "Kapton." This film is capable of continuous exposure to temperatures of 600° F. in substantial vacuum uses such as the present. It exhibits very good electrical properties and low out-gassing. It is a transparent film having a yellow cast, substantially of the same color as the yellow filter conventionally used as color correction in color projection. Additionally, the polyimide film is resistant to ionizing radiation.

The film is copper coated to a thickness of about 1,000 Angstroms, either within housing 48 as a preliminary step to its use, or exteriorly of the housing. Once in the housing 48, the film is subjected to iodine vapor at room temperatures so that the copper is converted to cuprous iodide, as described above. It may be desirable to deposit the cuprous iodide within the vacuum chamber without undue interference with the operation. This cuprous iodide coated film is first exposed at Station I, at electron gun 52. This exposure dissociates the cuprous iodide to metallic copper to form the latent image. After exposure that latent image is advanced to zinc vapor source 64 whereat zinc vapor is directed toward the latent image created by the electron beam exposure, to develop the latent image into a continuous tone image varying from opaque to the transparency of the film. From the zinc vapor source at Station II, the image is advanced to Station III which comprises the projection station.

The projection station has a projection lamp 66 which directs light through a condenser lens 68 and thence through the image on film 54 and projection lenses 70 to project an image onto screen 72. As previously described, the film can be intermittently advanced past this projection station by means of free loops together with an intermittent tooth drive, or the entire film 54 around all of its guide rolls can be intermittently advanced at the proper rate.

From the projection station, the film goes to station IV where the image is erased. This is accomplished by means of a heat lamp 74 directing radiant energy through lens 76 onto the film 54 to cause reaction of the zinc with the iodine atmosphere to form zinc iodide which evaporates. The zinc iodide can then be dissociated so that the zinc goes to development of the image at Station II. This reaction takes place above several hundred ° C. The copper is subsequently oxidized to cuprous iodide at room temperature and is aided either by the introduction of iodine at iodine inlet 78 or by the ambient iodine vapor, or both.

As is seen in FIG. 5, the lower portion of housing 48 is maintained at a proper pressure, as described above, for the presence of iodide and zinc vapor. However, in order to maintain the area around the electron gun at its preferred lower pressure, baffles 80 and 82 are provided adjacent to Station I. The film 54 passes through openings in the baffles, and through these openings sufficient vapor passes in order to maintain the remainder of the housing 48 at its desired pressure. Thus, two zones of subatmospheric pressure are maintained within housing 48.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A projector for projecting a visual image corresponding to an electrical signal containing image information, said projector comprising:

a support, a nucleation sensitive surface on said support, said support and said nucleation sensitive surface being substantially transparent;

radiation means adjacent said support for exposing said nucleation sensitive surface in accordance with an image information containing electrical signal fed to said radiation means to form a latent image on said nucleation sensitive surface in accordance with the image information contained in the electric signal;

metallic vapor deposition means positioned adjacent said nucleation sensitive surface to form an image by deposition of metal upon the latent image in accordance with the information contained in the electric signal to form more and less opaque areas to the transmission of light through the image area on said nucleation sensitive surface;

projector means positioned adjacent said nucleation sensitive surface for projecting light through said nucleation sensitive surface and said support to project an image in accordance with the information contained in the electric signal; and eraser means positioned adjacent said nucleation sensitive surface for removing the metal deposited thereon.

2. The projector of claim 1 wherein said support and said nucleation sensitive surface thereon is moveable with respect to said radiation means, said developing means, said projector means and said eraser means.

3. The projector of claim 2 wherein said radiation means, said developing means, said projector means and said eraser means are positioned at a plurality of stations and a particular image area on said nucleation sensitive surface is moveable between said plurality of stations.

4. The projector of claim 3 wherein said radiation means, said developing means, said projector means and said eraser means are positioned at separate successive stations and the particular image area is successively moveable to each of said plurality of separate stations.

5. The projector of claim 1 wherein said support and said nucleation sensitive surface on said support are moveably mounted within a housing and said radiation means, said developing means, said projector means and said eraser means are mounted with respect to said housing.

6. The projector of claim 5 wherein said support is electrically substantially non-conductive and has a substantially transparent layer of substantially electrically conductive material deposited thereon, said layer of metallic alloy being deposited on said substantially conductive layer.

7. The projector of claim 6 wherein said nucleation sensitive surface is a metallic alloy deposited on said support and said housing is filled with halogen vapor so that halogen is adsorbed on the metallic alloy surface, said metallic alloy being deposited sufficiently thin so that said support with its metallic alloy deposited thereon is substantially transparent.

8. The projector of claim 6 wherein said nucleation sensitive surface is a metal halide deposited on said support, and said housing is filled with halogen vapor corresponding to the metal halide so that the halogen vapor reacts with any free metal in the deposited layer of metal halide, said metal halide being deposited sufficiently thin so that said support with its metal halide deposited thereon is substantially transparent.

9. The projector of claim 6 wherein said support is made of substantially non-electrically conductive glass, said substantially electrically conductive layer is made of substantially electrically conductive tin dioxide and said nucleation sensitive layer is made of a nickel-chromium alloy.

10. The projector of claim 6 wherein said support is made of a flexible, substantially non-electrically conductive film of synthetic polymer composition material, said substantially electrically conductive and nucleation sensitive layers being made of cuprous iodide.

11. The projector of claim 6 wherein said developing means is a metallic vapor source so that metal is deposited on selected areas of said nucleation sensitive material in accordance with the information contained in the electric signal to said electron gun.

12. The projector of claim 11 wherein said developing metal vapor is zinc vapor.

13. The projector of claim 11 wherein said eraser means comprises a heater to heat the metal deposited on the image area to cause a reaction with the halogen atmosphere to form metal halogenide to remove all deposited metal from said nucleation sensitive surface so that said surface can be reused.

14. The projector of claim 13 wherein said metal deposited on the nucleation sensitive surface is zinc and said halogen atmosphere is iodine so as to form zinc iodide upon heating at said eraser means.

15. The process of projecting an image in accordance with image information contained in an electric signal comprising the steps of:

providing a nucleation sensitive surface on a support in such a manner that said support and said nucleation sensitive surface are substantially transparent;

exposing the nucleation sensitive surface to a radiation beam so that the radiation beam forms a latent image on said nucleation sensitive surface in accordance with the image information contained in the electric signal fed to the radiation beam;

developing the latent image on said nucleation sensitive surface by condensing metal from the vapor state onto the latent image in accordance with the image information contained in the latent image so that metal deposition takes place to form areas of different transparency in accordance with the latent image and the image information contained in the electric signal;

projecting the image by projecting light through said support and through the image area of reduced opacity to form a projected image corresponding to the developed image; and erasing said image on said nucleation sensitive surface so that said nucleation sensitive surface can be reused for image formation.

16. The process of claim 15 wherein said support and said sensitive surface on said support are mounted in a housing, which housing contains a halogen gas, so that said erasing step comprises heating the metal deposited in accordance with the image so that the metal reacts with the halogen gas to form metal halide which evaporates away from said sensitive surface.

17. The process of claim 16 wherein said erasing step is followed by the step of dissociating said metal halide into metal and halogen gas.

18. The process of claim 17 wherein said dissociating step comprises heating said metal halide to dissociate the metal halide into the metal and the halogen gas.

19. The process of claim 15 wherein said providing step comprises providing an adsorptive surface in a halogen gas atmosphere so that the halogen gas is adsorbed upon the adsorptive surface and said exposing step comprises directing a radiation beam onto the halogen gas adsorbed on the surface to cause desorption of the irradiated area to create a latent image corresponding to the irradiated area.

20. The process of claim 19 wherein the erasing step comprises heating the metal image to form a metal halide and permitting the image area to cool before subsequent exposure to permit halogen gas to adsorb on the surface.

21. The process of claim 15 wherein the providing step comprises providing a nucleation sensitive surface which comprises a metal halide on a support, and the exposing step comprises irradiating the metal halide to dissociate it into the metal and halogen gas to form the latent image.

22. The process of claim 21 wherein the erasing step comprises heating the condensed metal to form a metal halide and oxidizing the metal of the nucleation sensitive surface to form a metal halide so that the surface is ready for reuse for image formation.

References Cited

UNITED STATES PATENTS

| | | | |
|---|---|---|---|
| 2,922,352 | 1/1960 | Tuttle et al. | 95—89 |
| 3,153,785 | 10/1964 | Lehmann et al. | 343—5 |
| 3,196,765 | 7/1965 | Walkup | 355—5 |
| 3,200,724 | 8/1965 | Stamm et al. | 95—12 |
| 3,401,398 | 9/1968 | Lictenstein | 346—107 |

ROBERT L. GRIFFIN, Primary Examiner

R. L. RICHARDSON, Assistant Examiner

U.S. Cl. X.R.

96—27; 178—6.6